US006169990B1

(12) United States Patent
McGregor et al.

(10) Patent No.: US 6,169,990 B1
(45) Date of Patent: Jan. 2, 2001

(54) DATABASES

(75) Inventors: Douglas Robert McGregor; William Paul Cockshott; John Nugent Wilson, all of Glasgow (GB)

(73) Assignee: University of Strathclyde, Glasgow (GB)

( * ) Notice: Under 35 U.S.C. 154(b), the term of this patent shall be extended for 0 days.

(21) Appl. No.: 09/142,018

(22) PCT Filed: Feb. 28, 1997

(86) PCT No.: PCT/GB97/00578

§ 371 Date: Oct. 26, 1998

§ 102(e) Date: Oct. 26, 1998

(87) PCT Pub. No.: WO97/32263

PCT Pub. Date: Sep. 4, 1997

(30) Foreign Application Priority Data

Mar. 2, 1996 (GB) .................................................. 9604522

(51) Int. Cl.[7] .................................................. G06F 17/00
(52) U.S. Cl. .................................................. 707/101; 711/100
(58) Field of Search ............................. 707/100, 101, 707/102, 103, 509; 711/100

(56) References Cited

U.S. PATENT DOCUMENTS

| 5,297,279 | * | 3/1994 | Bannon et al. ........................... 707/1 |
| 5,437,027 | * | 7/1995 | Bannon et al. ........................... 707/1 |
| 5,511,190 | * | 4/1996 | Sharma et al. ........................... 707/1 |
| 5,515,534 | * | 5/1996 | Chuah et al. ........................... 707/1 |
| 5,530,854 | * | 6/1996 | Emery et al. ........................... 707/1 |
| 5,664,177 | * | 9/1997 | Lowry ................................. 707/100 |
| 5,706,501 | * | 1/1998 | Horikiri et al. ........................ 707/10 |
| 5,710,925 | * | 1/1998 | Leach et al. ........................... 709/303 |
| 5,758,152 | * | 5/1998 | LeTourneau ............................ 707/102 |
| 5,819,251 | * | 10/1998 | Kremer et al. ........................... 707/1 |

FOREIGN PATENT DOCUMENTS 0 350 208    1/1990  (GB) .

* cited by examiner

Primary Examiner—Wayne Amsbury
Assistant Examiner—Mary Wang
(74) Attorney, Agent, or Firm—Alston & Bird LLP

(57) ABSTRACT

A computer database for storing information in tuple form wherein each tuple comprises fields with corresponding fields in the tuples constituting a column, generates for each data domain a domain dictionary which matches each distinct data value in that domain with a corresponding distinct token, and stores each domain dictionary. A tokenised store for each data field column is created. All of the tokens for a domain are initially of the same size being substantially the minimum size necessary to provide the required plurality of distinct tokens for initialize size of that domain. When further tuples are received for storage for each field of the tuple, the data value is compared in the corresponding domain dictionary. If no match is found, a new token within the existing token size is generated and added to the domain dictionary, but if all tokens within the existing token size are utilised a new token is generated having a size which is at least 1-bit wider than previously, such broadened token being entered into a new tokenised store for that column.

7 Claims, 3 Drawing Sheets

RELATION: Relation Name, and set of TUPLES
Relation Name

Fields (Columns)

Tuples (Rows)

(All rows are 'distinct.' different from any other row. Order of rows is not significant.)

Each Field has a Field Name and data elements of the column must all belong to the same DOMAIN

DATABASES

BACKGROUND OF INVENTION

The present invention relates to computer databases and in particular to a method of constructing a compressed database, for example so that the database can be stored in solid state memory.

Modern information storage systems are required to handle large amounts of data in a cost effective manner and are designed to allow access to the stored data easily and quickly. Considerable research has been performed on databases with most attention being focused on ferro-magnetic disc resident databases which are deemed suitable for handling large amounts of data due to the relatively low cost of the technology. Unfortunately, even with the use of the latest technology, individual read/write operations involving disc resident databases are inherently slow due to the mechanical nature of the disc system. In order to improve disc resident databases therefore, much attention has been focused upon increasing the speed of the databases by alleviating the disc input/output bottleneck.

In its simplest form a computer database is typically arranged in the form of a table which is stored in a continuous area of disc memory (typically the tables are stored row after row in a sequence of consecutive memory locations). The table is divided into a series of rows and columns to provide, at the intersection of the rows and columns, locations in which individual data values can be stored. The values in a given row in combination provide a "tuple" which is unique to that row. For example, in a typical employee database storing information concerning say 100 employees, the database would typically comprise 100 tuples, each tuple being defined over a plurality of fields, for example, the fields of name, age, employee number etc.

Databases are often organised as a set of linked tables in a format known as a relational database. A relational database consists of a set of stored data representations—the relations—and a set of operations defined to operate on the relations. Each relation is a set of tuples and the structure of a relation is illustrated in FIG. 1. Each tuple is unique, and is a concatenation of an ordered set of data values. The data values in a particular field of all the tuples of a particular relation form a column of the relation but also belong to a domain (i.e. a set of data values greater than or equal to the number of data values in that column of the relation). Different columns from the same or different relations may belong to the same domain, e.g. where all these columns contain say dates. In a conventional implementation, the relations are in the relational store, with the tuples implemented as records directly mapping the input form of the information. A 'relational processor' carries out the defined relational operations, to and from input/output devices and the relational store.

The actual data values are physically stored in an ordered aggregate record. Thus a conventional database system must allocate sufficient storage space to allow for the largest storage representation resulting in a considerable waste of storage for all but the exceptional tuple.

An alternative organisation is to use a separate dictionary to store variable length data values, representing these in the tuple field by means of a token supplied from the dictionary. The full data item can be retrieved from the dictionary when required, for processing or output. This more space-efficient method is not adopted by most conventional systems because it requires multiple accesses to the dictionary for every tuple input, output, and update, and also for processing queries. Particularly where queries involve fields with large numbers of different tokens, such look-ups are prohibitively inefficient with a conventional disc-based dictionary, while RAM-based dictionaries have required too much space to be economic.

Processing of relational databases requires the location, matching and selection of tuples and their combination by a defined set of operations—the relational operations. Typically these require the selection of tuples with some specified field values, or ranges of values, while other fields may be unspecified.

Indexes are frequently employed, particularly to give rapid access to fields frequently specified in queries. Indexes thus speed access when data is to be retrieved, but have a cost in terms of the space they occupy, and in the time and processing required in their construction as data is added or updated.

Another consideration has been the volatility of information held in high-speed RAM storage. As security of the data is paramount in database systems, conventional systems have not regarded data as 'secure' until stored on non-volatile backing-store, i.e. the backing-store has been regarded as the normal location of data, which is only brought into high-speed store transiently for processing or update. Though secure, this represents a time overhead on processing, which compounds the difficulties of ensuring the isolation of one transaction from another. Locking has had to be of fine granularity, and is a heavy overhead.

The conventional system is thus constrained to use slow disc-based storage (because of the large cost advantage of disc technology over more rapid RAM or other solid-state technologies), is forced to use that storage in a non-compact way to avoid the overload of dictionary look-up, is forced to construct maintain and store indexes to speed access performance, and is forced into a costly locking scheme to maintain consistency. The net result is that conventional systems require large volumes of disc-based storage and their operation is very slow (relative to RAM-based computation operations).

While the slow speed of operation of the disc-based conventional system can in principle be overcome by replacing the discs by much faster electronic technology, this has so far been economically unattractive (except for special purpose small, high-speed applications) because of the x10 to x100 higher price of RAM.

As already outlined above, the main problem with disc based databases is the slow speeds at which the disc can be accessed. For example, using the example of the employee database given above, if it is required to extract information on an employee named "John Smith" from the database it is necessary to retrieve tuples having the data entry "John Smith" in their name field. Such a search may involve a large number of individual read and comparison operations for each individual search.

A number of techniques have been employed by database designers to increase access speeds to disc resident databases. One technique in common usage is that known as 'hashing'. Hashing requires the original data to be stored in a less compact form, or alternatively with additional indices known as hash access vectors. As indicated above, disc storage space is considered to be relatively cheap and the increase in the size of the database produced by hashing is generally thought to be an acceptable trade-off for the resulting increase in access speed. Hashing is an example of the need to store the original data in a non-compact form.

The foregoing descriptions illustrate the inherent conflict between the aim of compressing a database whilst simultaneously increasing access speeds.

SUMMARY OF INVENTION

It is a first object of the present invention to provide a method of constructing a database which optimises data compression ratio and access speed.

It is a second object of the present invention to provide a database construction method which optimises the database creation rate and minimises the amount of memory space required during creation.

It is a third object of the present invention to provide a database structure which minimises the requirements for memory reorganisation operations when both creating and modifying the database.

According to a first aspect of the present invention there is provided a method of constructing a computer database for storing in compressed form information comprising a plurality of tuples, wherein each tuple comprises a data value in each of a plurality of fields with corresponding fields in the tuples constituting a column, the method comprising the steps of:

(a) defining a plurality of domains;

(b) receiving said information in an uncompressed form and assigning each data value into a corresponding domain, wherein data values in the same field are assigned to the same domain;

(c) generating for each domain a domain dictionary which matches each distinct data value assigned to that domain with a corresponding distinct token, and storing each domain dictionary in a domain-dictionary store;

(d) creating a tokenised store for each column and storing therein the corresponding distinct token for each pertaining field data value;

wherein the method further comprises arranging that:

(e) all of the tokens for a domain are initially of the same size and that size being substantially the minimum size necessary to provide the required plurality of distinct tokens for the initial size of that domain;

(f) when further tuples are received for storage for each field of the tuple the data value is compared in the corresponding domain dictionary and if no match is found a new token within the existing token size is generated and added to the domain dictionary but if all tokens within the existing token size are utilised a new token is generated having a size which is at least 1-bit wider than previously, such broadened tokens being entered into a new tokenised store for that column; and (g) the tokenised stores and the domain dictionary stores are arranged in the computer memory as respective data blocks or respective sets of data blocks which are independently relocatable within the computer memory whereby ones of the data blocks may be modified in size to accommodate such broadened tokens without requiring consequential modifications to be made to others of the data blocks.

In one embodiment when a broadened token is generated for a particular field all existing tokens within the pertaining column are broadened by the same amount and the corresponding tokenised stores are enlarged.

In another embodiment when a broadened token is generated for a particular field only the new token and subsequent new tokens are broadened and such broadened tokens are entered into a new tokenised store for the pertaining column.

Databases constructed using the above method achieve high compression ratios where the number of tuples in the database is relatively high but the number of distinct data values in each domain is relatively low, i.e. there is a high level of repetition in the data stored. For example, a domain of names containing the first names of 1000 different people many of which are repeated—say, for example, 'John' appears say 50 times, but there are only 100 distinct or different, names e.g. John, Douglas, Paul,—may be compressed to a relatively large extent using the present invention.

The present invention is particularly applicable to the storage of data in a random access memory (RAM), and more preferably a semiconductor RAM, in particular non-volatile RAM such as FLASH EPROM. Data may be allocated to the RAM memory using a "heap" allocation method. It will be appreciated that the present invention is particularly suited to the use of RAM based storage as a number of additional processing steps for each individual search operation can be tolerated.

The method set out above may be used to generate an entire database from received information such that all of the data in each column of the database is stored, in compressed tokenised form, in a corresponding single continuous block of memory. As individual tuples are received, for each field, the data values are compared in the corresponding domain dictionary with data values already received for that domain. If a match is found, the new data value is replaced by the previously determined minimum entropy token for that data value extracted from the associated domain dictionary. If no match is found, a new token is generated to replace the data value and is added to the associated domain dictionary. If there are no unused tokens within the existing token size, the token size is increased or broadened, e.g. by 1-bit, hereinafter referred to as 'column-broadening'. All tokens previously entered into the column of the relation table may be replaced by new larger tokens. Because the tokenised columns are stored in independently relocatable and not necessarily non-contiguous areas of memory, this process does not have a 'knock-on' effect on other columns.

Column-broadening will normally be effected by only 1-bit at a time, however it will be appreciated that column broadening could be undertaken at a different bit-enlargement rate and that rate need not be constant throughout the generation of the database.

Column broadening may still involve a costly time overhead when creating or modifying a database. One approach to reducing this overhead is to use the above method to generate a first portion, or set of tokenised blocks, of a database from a first received set of tuples. Once the size of a block reaches a predetermined threshold size, a new column block is created by using the domain dictionaries created for the first block. When, for the new block, the token size is broadened to enable the provision of a unique token for a new unique data entry, only the tokens in that new block need be broadened. This process is repeated every time the current set of column blocks reaches the predetermined threshold size. It will be appreciated that whenever it is necessary to increase token size, this partitioning of the tokenised columns into blocks requires that re-tokenisation is only necessary for the last block to be generated or, when data is being updated, to the current block containing the update.

It will be understood that initially the token size may be only 1 bit—for example to represent a field where masculine/feminine gender is represented or to represent a field where initially only two alternatives are represented but where subsequently three (or more) possibilities require to be represented (such as the location of a legal court case initially being either in London or Edinburgh but subsequently being in London or Edinburgh or Paris or Brussels, etc, etc).

Systems embodying the present invention may make use of additional techniques for increasing the rate at which data in the compressed database can be accessed. For is example, the technique known as "hashing" and described above can be used.

During the creation of a database it is often necessary to 'bulk-load' a large number of tuples which can create serious memory management problems. A preferred method of bulk-loading data involves generating a set of tokenised columns as set out above and subsequently generating a set of hash access tables. By generating these tables at the end of the loading process, the need for continuously re-hashing the data as it is loaded is eliminated.

In order to increase the rate at which a database can be accessed, a composite indexing method may be employed. This requires the generation of a single hash access table to which all or several fields contribute. When a search of the database is conducted where only a subset of the key fields are specified, the 'missing' bits are provided by a counter which runs through all possible 'don't care' values for the unknown keys.

For a better understanding of the present invention and in order to show how the same may be carried into effect, reference will now be made, by way of example, to the accompanying drawings, in which:

DETAILED DESCRIPTION OF INVENTION

As has been discussed above, designers of conventional disc based databases, of the type generally utilised for storing large amounts of data, have in the past tended to accept the requirement for increased storage space in order to increase the speed with which data can be accessed. Recently, some database designers have turned their attention from disc based databases to databases resident on solid state random access memories (RAM) as RAM's are becoming available with ever increasing storage capacities. The advantages of RAM memories are the high rates at which individual read/write operations can be carried out, typically some five orders of magnitude faster than read/write rates of disc based systems. However, in transferring databases from disc based systems to RAM systems, designers have tended to apply state of the art technology developed for disc based systems in an attempt to attain even greater speed advantages and have thus encountered the problem of how to store large and expanded databases on relatively expensive RAM memory (the cost of RAM memory is approximately 10 to 50 times greater than the cost of disc memory, bit for bit). Therefore, the applications of RAM based databases have tended to be limited to systems where only a small amount of data needs to be stored, for example hand-held personal organisers or high-value high-performance applications where it is economically feasible, both from a space and a cost point of view, to use large banks of RAM's.

The inventors of the present invention have realised, contrary to conventional thinking in this area, that when designing RAM resident database systems it is feasible to increase the number of individual memory read operations required for each query if this reduces the space which the database occupies. The vastly increased speed at which a RAM memory can be accessed, in relation to disc memories, means that even with a small number of additional operations being required the database will still operate several orders of magnitude more quickly than disc resident databases. In particular, compression methods which have been dismissed for use in disc resident databases, because the resulting decrease in performance is prohibitive, can be advantageously used in RAM resident databases.

Figure 2:
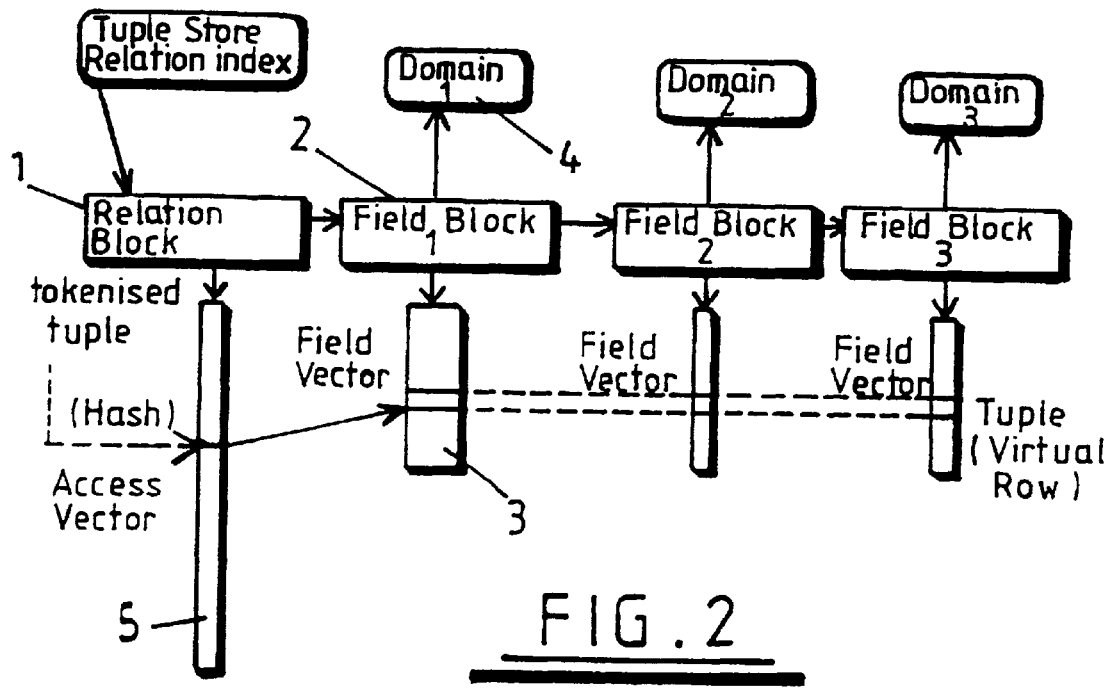
FIG. 2 shows in schematic form the organisation of a database.

A particularly space efficient storage method will now be described with reference to FIG. 2 which shows a database where the data values contained within each field or column of a relation are uniquely assigned to an associated domain. A relation block 1 provides information pertaining to the relation as a whole, such as the number of tuples and the size of the relation's hash access vector. The relation block 1 addresses a list of field blocks 2, each of which addresses one field of the relation and one domain dictionary 4 (n.b. in the arrangement of FIG. 2 the number of domains is equal to the number of fields although, in practice, two or more fields may be associated with a single domain). As can be seen, the relation is actually stored by columns, a row (tuple) actually being obtained by addressing correspondingly subscripted tokens in each of the field vectors 3. This is not the only possible arrangement, one alternative being a row-oriented structure.

The field vectors 3 are vectors of tokens of minimum length required to provide distinct identifiers for each data value in the domain in which the field is defined. If for example there were 4000 distinct data values in the associated domain dictionary 4 then the token width would be set to accommodate this diversity, and each token will have 12 bits (accommodating a maximum of 4096 different values). If further values are added to the domain dictionary 4 however, when the total exceeds 4095, 13 bits will be required (to address up to 8191 values). This requires the reallocation of the tokens in all the field vectors belonging to the domain, to accommodate the new 13-bit wide tokens as elements. The column-wise organisation of the data is easier to extend as smaller blocks require to be reallocated and freed than would be the case if the relation were a contiguous table. It should be noted that the breadth of each token depends only on the number of distinct data values in the domain, not on the number of tuples in a relation.

As tuples are added to a relation, if an element is new to the domain, it is added to the domain dictionary 4, and a new token allocated as described above. The 'maximum tuple' number is then incremented, providing the subscript of the new tuple, and the tokens for each of the tuple's elements are added to their appropriate columns. As the space allocated to a field vector 3 becomes full, eventually there is insufficient space, but the allocated space is automatically adjusted as required by a side effect mechanism called into play by the addition, or deletion, of tuples, as will be described later. Finally the tuple's subscript is inserted into the appropriate location of the relation's hash access vector 5, so that it can be efficiently associatively accessed via the tuple's contents. It should be noted that the tuple subscripts are not necessarily allocated in a chronologically sequential manner as they are inserted. The existence of the hash access vector 5 permits tuples to be given arbitrary subscripts (provided that they are in the permitted maximum range, and are in one-to-one mapping with the tuples). This is exploited in a second order compression mechanism (see below).

Figure 3:
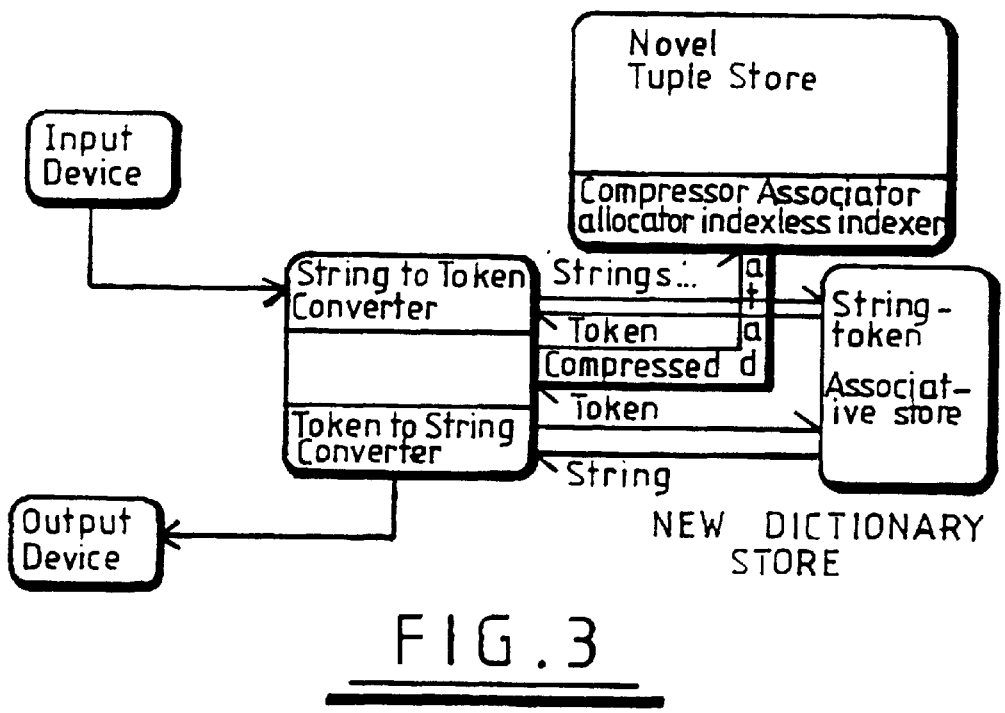
FIG. 3 shows a system for generating and operating a minimum entropy database having the structure shown in FIG. 2.

The dictionary mechanism is an innovative extension of a conventional symbol table mechanism, as commonly employed in high-level language compilers. A typical mechanism is shown in FIG. 3. Such mechanisms commonly provide the following functions:

String-to-token Conversion

Basically a two-entry table, in which one entry is the string, the other its corresponding token—fast access associative hashing methods are normally used to ensure that the appropriate entry is located with little if any search. Presented with an already-entered string, the mechanism returns the appropriate token. Presented with an undefined string, the mechanism provides an 'undefined' indication.

Token-to-String Conversion

This is the inverse operation, returning the string value of any defined token presented to it. A look-up table, directly addressable by the token, is normally included in the mechanism to provide rapid operation, avoiding significant searching.

New String Insertion

This causes a new entry to be set up for the new string, and a corresponding new token allocated and associated with it. Henceforth presentation of the string will result in the token being returned whilst presentation of the token will result in the string being returned.

The Modified Dictionary

Modifications arise from two causes:
1. The need to reduce the volume of the domain dictionary storage. After the tuple store has been compressed the dictionary assumes a significant proportion of the total space occupied by the database.
2. The need to provide disjoint token sets, with a minimum range of tokens, for each distinct domain.

A Dictionary Mechanism with Compression

As is common in conventional symbol tables, the variable length strings are allocated dynamically from a 'heap', a fixed-length pointer to it being stored in the symbol table record. The symbol string is compressed by employing a standard compression method such as Huffman Coding.

Numeric strings can be compressed as binary integers, a special class of symbol.

Compression has most effect on large fields containing information with poor granularity, perhaps descriptions, remarks or addresses of people or organisations. It can be applied at two levels:
1. At the word/phrase level
2. At the character/word level Specific methods are used for other types of Binary Large Objects, such as images.

Domain Blocks

Each domain is a separate disjoint set. It can thus have a separate disjoint set of tokens. The list of tokens allocated to strings in a particular domain is maintained at the domain level.

There is thus an interconnection between the field blocks, and the domains. Each field belongs to a domain.

There are multiple dictionaries, one per domain. In each the entry corresponding to the string has an associated token value for the corresponding Domain. In order to determine the explicit token value conversion, the translation mechanism must therefore specify the domain as well as the string as parameters.

Second-Order Compression of Tuples

The compression discussed earlier was first order, leaving each token in a domain with the same length. This is convenient, allowing direct addressing of each tuple, if required. Compression can be increased, however, by:

Arranging that the most similar records are adjacent to each other. This is done by sorting the records such that the most slowly altering fields are the most significant keys in the sort, and so on;

Ensuring that the differences, between corresponding fields in adjacent tuples are stored; and Applying a variable-length coding (such as Huffman Coding), and/or a run-length encoding to the result.

The effect of this is to produce a further major reduction in the tuple space, but at a cost of reduced access performance, as individual tuples cannot now be directly addressed individually, without first decompressing their environment.

Indexing

Indexes are a storage and update overhead, but greatly improve retrieval performance. Under the conditions most commonly encountered in database applications, retrieval is by far the commonest type of operation, and hence indexing is adopted particularly for those fields most commonly specified in queries. However each field index is an overhead, thus it is desirable to include only those deemed necessary for the particular applications supported by the system. There are three possibilities:
1. Individual field index.
2. Combined field indexes.
3. No field index.

Partial/Total Hashing

This mechanism is adapted to database use from the method known as Lloyd Hashing for use in the field of Logic Programming, for accessing Prolog clauses, in an interpreter for the Prolog language.

The general method of hashing is well-known. Associative access to a tuple in a table can be speeded by applying hashing. This involves calculating the table subscript by applying a suitable hash function to some subset of the tuple in a particular query. The Lloyd Hashing method employs a single access table to which a number of tuple fields may contribute.

To give an explicit example, consider the following tuple with 5 fields, with the following token lengths: field1 field2 field3 field4 field5: 10 bits 8 bits 6 bits 4 bits 2 bits. Total 30 bits.

Relation Access Table Size 2027 entries (for relation with 1600 tuples).

Number of bits required to address Relation Access Table=11.

Bits are allocated to the Access Table Address on a round robin basis from the fields:

12345123451=3 2 2 2 2 (ie Field 1 provides 3 bits and each of Fields 2,3,4 and 5 provides 2 bits)

If the first field was most commonly used as a key, and the last two were never used as keys (Key fields being specified as a property of the relation), we could allocate bits to the Access Table Address, thus:

11231231231=5 3 3 (ie Field 1 provides 5 bits and each of Fields 2 and 3 provides 3 bits)

Where only a subset of the key fields can be specified, the corresponding bits are supplied from a counter which runs through all the possible 'don't care' values for the contributions of the unknown keys to the hash address for the Access Table. A bit-list can ensure that each access table entry is accessed only once. The effect of this is to reduce the accesses required.

Where, however, there are a several Candidate Keys, and users typically specify only one of them [but not the same one] in a query, the Lloyd Hashing scheme suffers a loss of information and a dramatic drop in performance results. For this reason therefore, the user, (system administrator) is allowed to selectively specify the class of indexing required for each field.

The new system obtains its superior performance and cost/effectiveness through a number of innovations, and the innovative combination of a number of separate elements. These are:

1. The minimum entropy tokens: tokens of minimal length for the purpose of distinguishing their unique value.
2. The domain-limitation of tokens. This allows identical tokens to be employed in different domains, without being internally confused by the system, and with different external data representations. The net benefit is that smaller tokens can be used throughout.
3. A dynamic storage organisation and mechanism capable of utilising such representation to minimise storage requirements.
4. The use of such a data representation in conjunction with a scheme of full/partial tuple hashing described here as Indexless Indexing, to achieve rapid retrieval, collation (joining), insertion, update and deletion of required tuples or sets of tuples.

The system described here is applicable whatever the storage technology, providing compactness of data and much faster operation than with a system of conventional design. Compressed representation can also be used in a distributed database, where the compact data representation is particularly beneficial in speeding the data transfers during operations of the system, as well as reducing storage volumes and costs.

It is particularly suited for use with battery-backed RAM, EEPROM or other solid-state memory, and is currently of particular relevance to large high-performance database servers at one extreme and hand-held and portable 'Organiser Systems' at the other.

In large-scale systems and particularly high performance systems its use provides several orders of magnitude improvement in performance without a major increase in cost, over the corresponding conventional system.

It is thus particularly well-suited to the support of MIS and other statistical query systems, and any systems which require high-bandwidth access to their stored information.

A requirement of modern database systems, in addition to high access rates, is that they must be flexible, allowing data to be added and deleted during the normal operation of the database. If the 'tokenised' database were to be stored in a continuous block of memory (i.e. having sequential addresses), when it became necessary to broaden previously assigned tokens of one field it would be necessary to reorganise all of the tokens in all of the fields. This would require a considerable level of memory reorganisation and represents a considerable time overhead when constructing or modifying a database which in certain circumstances may be intolerable.

The present system therefore adopts the approach of storing the tokenised field columns in respective relocatable and hence potentially non-contiguous regions of memory. Thus, when it is necessary to increase the size of tuples in one of the columns it is only necessary to rearrange the tokens of that particular column. The other column will be unaffected. Such "disjoint" storage can be achieved using a conventional "heap" allocation of memory space (Bishop, P. B., Computer Systems with a Very Large Address Space and Garbage Collection, PhD Thesis, MIT, 1977).

A further reduction in the time overhead involved in broadening previously allocated tokens can be achieved by partitioning each column into a number of blocks, so that only the tokens in the most recently created block need be broadened when a new token is required which cannot be provided by the existing token width. This technique will be explained further in the following detailed description of one embodiment of the invention.

The compressed database relies upon the existence of a heap storage system such as is provided in most modern programming languages. On top of this an abstract data type, the compressed vector, is constructed. Conceptually, a compressed vector is an indexed sequence of integer storage locations. This abstract type is used as the foundation for all of the concrete forms of store—dictionaries, columns of tables etc used in the database. It is thus important that this type be so implemented as to ensure that the minimum amount of bits are occupied by the sequence of integer storage locations.

In state of the art means of implementing a vector of integers, each location in the sequence would be allocated a fixed number of bits, typically the number of bits in a machine word. Further, in the state of the art implementation of vectors the number of storage locations in the vector must be specified when it is created. This is clearly wasteful of space on two grounds:

1. The actual integers that one wishes to store in the locations may belong to a small subrange of the integers and could thus be encoded in less than a machine word. This can mean that the greater part of each word of the vector is wasted, with the most significant bits being filled with zeros.
2. If one does not know in advance how long the sequence of integers is, the computer program has to allocate a large number, which it is hoped will suffice. If the number of locations used in the vector grows gradually with time, this entails that at the start, the greater number of locations will be unused and thus constitute wasted space.

Figure 5:
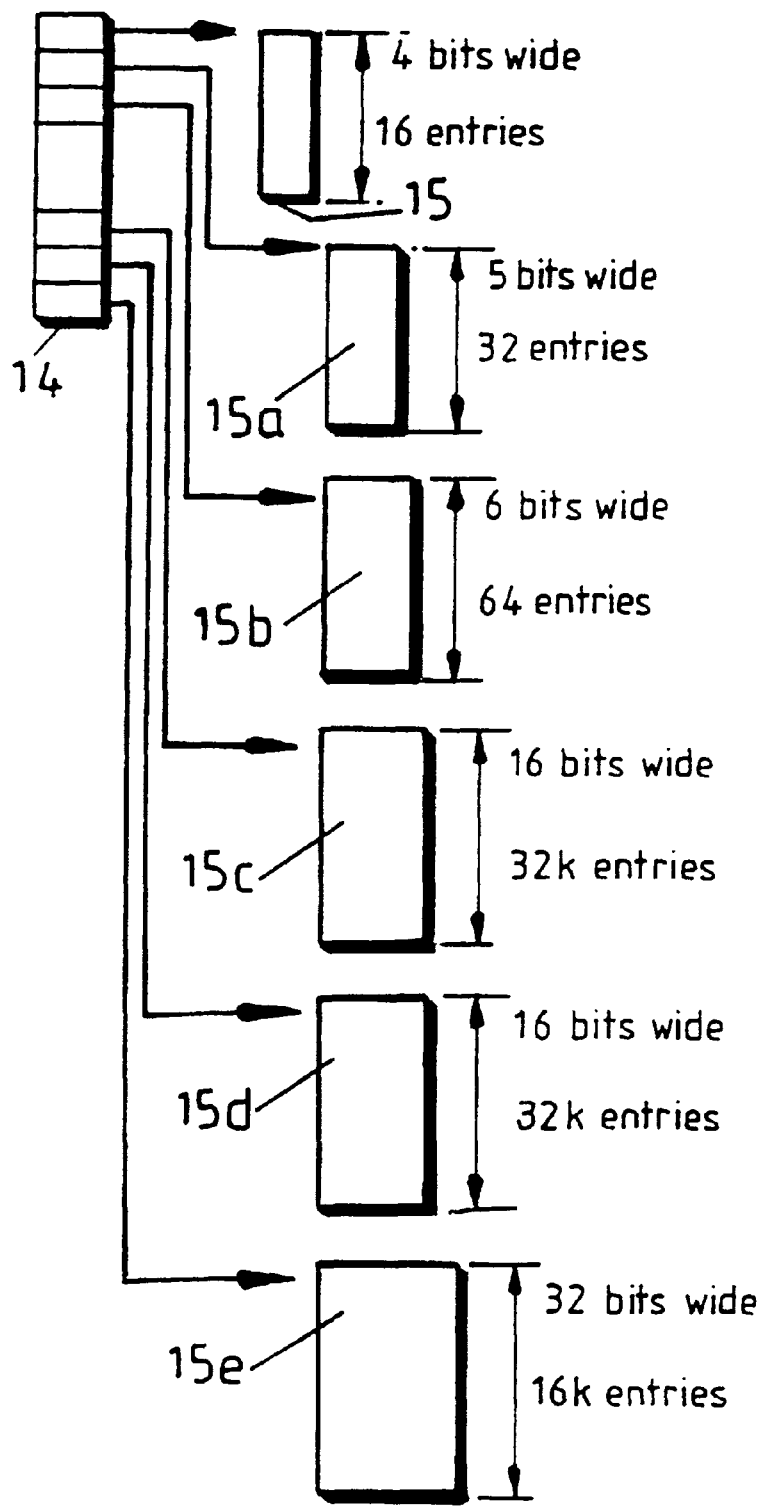
FIG. 5 illustrates schematically a two-dimensional mapping of the database of FIG. 2.

The compressed vector implementation used in this invention implements the vector as shown in FIG. 5. It consists of an array of pointers 14 which point to blocks of memory 15, 15a, 15b etc. These blocks hold the actual storage locations. In FIG. 5 the first 16 locations of the vector would be in block 15, the next 32 in block 15a, etc. Whereas in a conventional vector all of the storage locations would be the same size, conventionally a machine word, in the present system the locations can:

a) be smaller than a machine word b) be of different sizes in different parts of the vector.

Within each of the field blocks 2, 2a, 2b . . . (in FIG. 2) the size of the locations is dynamically adjusted to contain enough bits to hold the largest integer currently stored in the block. Thus in the example in FIG. 5, none of the first 16 locations holds a number larger than 15, and can thus be stored in 4 bits. In the next 32 locations no number is larger than 31 and can thus be stored in 5 bits.

If at any stage an attempt is made to store a larger number in a location than is possible taking into account the bit lengths of its locations, then all of the locations in the block are widened as necessary. Suppose that the number 100 was to be inserted in the third location. The number 100 requires to be stored in 7 bits which is more than can be stored in the 4 bit fields of block 15. The software responsible for maintaining the compressed vector type now allocates a new block 15' (not shown) of length 16×7 bits=112 bits. The numbers currently stored in the locations of block 15 are now copied to the corresponding larger locations in block 15', the pointer to block 15 in vector 14 is set to point to block 15', and block 15 is returned to the heap store. Following this, the third location can be updated with the number 100.

As the number of locations required in the compressed vector goes up, additional blocks 15c, 15d etc. can be added to the vector. These blocks may be of increasing sizes up until some fixed maximum number of entries per block (32K in the example). It may be convenient to allow the last block 15' allocated to gradually grow up to this size before allocating a new block $15_{i+1}$.

In the implementation of a compressed database it is often the case that the numbers in lower positions in the vector are smaller than those in subsequent locations. The organisation shown thus makes very efficient use of storage space.

Compressed vectors provide a convenient means of implementing the columns of relations, access tables for hashing, and the internal structures of the dictionaries of the compressed database.

To create a new relation, the database system allocates a sequence of compressed vectors, one per column of the relational table, such that the vectors are initially of a comparatively short length and narrow width, for example they may all be 1 bit wide and one location long. Associated with each column is a pointer to a domain dictionary as shown in FIG. 2.

To insert a tuple into the relation the following procedure is followed.

1. A new tuple number n is allocated to the tuple such that n is one greater than the highest previously allocated tuple number.
2. For each field in the tuple the following sub steps are followed:
    i) The field is sent to the appropriate domain dictionary for its column and converted to a token t.
    ii) The token t is stored in the compressed column vector of the field at location n. This may cause lengthening of the compressed vector, and also may cause widening of the locations in a sub-block of the column vector as described earlier.

Due to the partitioning of the field columns into blocks, it is never necessary to broaden the tokens of more than one field column at any given time. This construction limits the time overheads when constructing the database. Similarly, if a new tuple is added to an existing database, and that tuple contains a new distinct data entry in one of its fields which cannot be accommodated within the truncated token length of the final field block, only the tokens of that final block need be broadened.

This process is carried out for each column to create a plurality of compressed or tokenised columns, each made up of a number of blocks, and a plurality of domain dictionaries, the number of domain dictionaries being less than or equal to the number of fields.

From the compressed fields, a hash access vector is then constructed.

Figure 1:
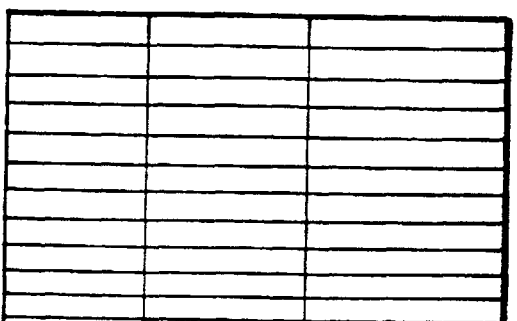
FIG. 1 illustrates a relation of a relational database.
Figure 4:
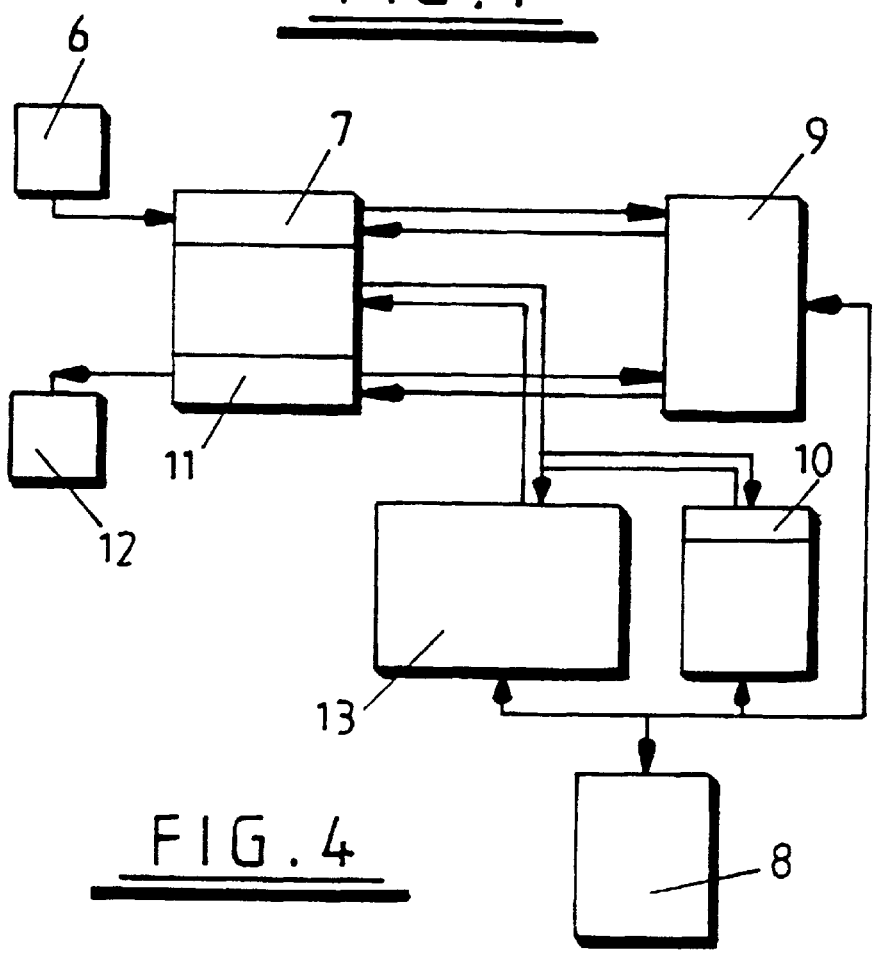
FIG. 4 shows in more detail a system for generating and operating a database having the structure of FIG. 2.

FIG. 4 shows in schematic form a system suitable for providing a compressed database in accordance with the above and which may be implemented on a conventional computer providing the computer has sufficient non-volatile random access memory. The system comprises an input device 6 (e.g. a keyboard) for inputting data into the database and which is coupled to a string-to-token converter 7. The converter 7 performs the function of converting data entries in each field of a tuple into their respective entropy-encoded tokens. The converter 7 is indirectly coupled to a tuple store 8 for receiving tokens from the converter 7 and for storing received tokens in the appropriate compressed field column blocks, separate field column blocks being stored in separate, non-contiguous, areas of memory. Also coupled to the converter 7 is a token store 9 which contains the token dictionaries.

The token store 9 and the converter 7 are coupled to a hash access table generator 10 which generates hash index tables following construction of a tokenised database. The generator 10 is also arranged to receive tokens corresponding to search enquiries, to generate the corresponding hash address, and to cause the tokens at the or each generated address to be passed back to a token-to-string converter 11. The converted data is output via an output device 12. Memory management is carried out by a memory controller 13.

As has been indicated above, the use of minimum entropy tokens enables the overall database store to be compressed to a significant extent. It is however possible to compress the minimum entropy database even further by considering the multiple dictionaries created by the tokenisation process and which will generally occupy the major portion of memory space (e.g. a factor of 10 greater than that occupied by the tokenised table). The approach adopted herein suggests that a small increase in the number of steps required to access the dictionaries is acceptable, given the operating speed of the random access memory, if this achieves a significant compression of the dictionaries. Huffman coding is one possibility for compressing the dictionaries. A second possibility is a gram encoding method such as LZW. Suitable compression structures are described, for example, in an article by Williams, G., Meyer, R., Amis, F., entitled "The Panasonic and Quasar Hand-Held Computers" published in Byte, January, 1981, p34–44.

Conventionally a vector or one dimensional array is implemented as a contiguous set of memory locations, embedded amid other data storage structures currently in use. This is convenient provided the length of the vector does not have to be increased (or decreased). Given the requirement to vary the length, however, the system must do the following:

1. Locate a contiguous area of memory sufficient for the new size of the array.
2. Copy the old array contents to the new area.
3. Switch its identity to the new area.
4. Release the old contiguous area to the system memory manager for re-allocation.

There are several problems with the above contiguous approach. As arrays grow larger, so larger blocks of contiguous memory are requested from the system memory manager. In many systems this can result in the system not being able to supply a sufficiently large contiguous block, although sufficient memory is free and available, but in separate pieces.

The approach requires copying of all the data each time the array is extended. In memory-resident database systems, inefficiency results, and the copying process causes arbitrary delays to processing as the array contents are copied to their new location. These are serious problems for the system designer or users who normally prefer predictable performance. Indeed in real-time applications arbitrary behaviour of this type cannot be tolerated.

In the new arrangement one dimensional vectors are mapped on to a 2D structure consisting of a set of 'extents', as is shown in FIG. 5. Given that the extents have a maximum size (maxE) the ith element of the original 1D vector is in the jth extent where $$j := i \text{ DIV maxE}$$

at the Kth element, where $$K := i \text{ mod maxE}$$

The advantages of the 2D arrangement are:

1. The system memory manager never has to deal with a maximum block size greater than maxE. The different extents can be non-contiguous. In many cases this can result in more efficient usage of space, and less wastage of time by the system memory manager.
2. There is a particular advantage when a vector has to be lengthened. In this case an additional extent can be added without copying any of the penultimate blocks of the original structure. Only the last (partial) extent needs to be copied, though this overhead can be avoided if it is arranged that the vector always consists of a number of complete extents.
3. Corresponding advantages exist for the case of shortening a vector.

It will be appreciated that various modifications may be made to the embodiment described above without departing from the scope of the present invention. For example, in order to speed up the rate at which the tokenised database can be accessed, and as an alternative to the hashing approach, the tokenised fields can be organised as K-D tree arrangements which function to return the nearest neighbour, or the set of K-nearest neighbours of a given field specification. A description of K-D trees is given in Friedman, J. H. Bentley, J. L., and Finkel, A. F., "An Algorithm for Finding Best Matches in Logarithmic Expected Time", ACM Transactions on Mathematical Software, Vol. 3, No. 3, 1977.

What is claimed is:

1. A method of constructing a computer database for storing in compressed form information comprising a plurality of tuples, wherein each tuple comprises a data value in each of a plurality of fields with corresponding fields in the tuples constituting a column, the method comprising the steps of:

(a) defining a plurality of domains;

(b) receiving said information in an uncompressed form and assigning each data value into a corresponding domain, wherein data values in the same field are assigned to the same domain;

(c) generating for each domain a domain dictionary which matches each distinct data value assigned to that domain with a corresponding distinct token, and storing each domain dictionary in a domain-dictionary store;

(d) creating a tokenised store for each column and storing therein the corresponding distinct token for each pertaining field data value; wherein the method further comprises arranging that:

(e) all of the tokens for a domain are initially of the same size and that size being substantially the minimum size necessary to provide the required plurality of distinct tokens for the initial size of that domain;

(f) when further tuples are received for storage for each field of the tuple the data value is compared in the corresponding domain dictionary and if no match is found a new token within the existing token size is generated and added to the domain dictionary but if all tokens within the existing token size are utilised a new token is generated having a size which is at least 1-bit wider than previously, such broadened tokens being entered into a new tokenised store for that column; and (g) the tokenised stores and the domain dictionary stores are arranged in the computer memory as respective data blocks or respective sets of data blocks which are independently relocatable within the computer memory whereby ones of the data blocks may be modified in size to accommodate such broadened tokens without requiring consequential modifications to be made to others of the data blocks.

2. A method as claimed in claim 1, wherein when a broadened token is generated for a particular field all existing tokens within the pertaining column are broadened by the same amount and the corresponding tokenised stores are enlarged.

3. A method as claimed in claim 1, wherein when a broadened token is generated for a particular field only the new token and subsequent new tokens are broadened and such broadened tokens are entered into a new tokenised store for the pertaining column.

4. A method as claimed in claim 1, wherein the constructed database forms a portion of a larger database which is under construction, and wherein when the size of a tokenised store for a column reaches a predetermined threshold size a new additional tokenised store for that column is created using the domain dictionary created for the first tokenised store for that column.

5. A method as claimed claim 1, wherein the information is received as a bulk-load and the method set forth in any preceding claim is first applied and thereafter a set of hash access tables is generated.

6. A method as claimed in claim 5, wherein the set of hash access tables includes a composite hash table to which all or several fields contribute to enable a composite indexing method to be used for accessing the database.

7. A computer database when constructed in accordance with the method of claim 1.

* * * * *